ically traveled. A radius of curvature R (mm) of the tape sliding surface and a distance W (mm) between the tape sliding surfaces are so set as to satisfy the conditions of $19.5-20W \leq R \leq 21.5-20W$ and $0.15 \leq W \leq 0.45$. Accordingly, a quantity of sinking of the magnetic tape at the gap between both the core tips is limited to thereby reduce a noise in a special reproducing operation such as a reverse video search operation.

United States Patent
Kera et al.

[11] Patent Number: 5,034,840
[45] Date of Patent: Jul. 23, 1991

[54] MAGNETIC HEAD FOR A VIDEO TAPE RECORDER HAVING OPTIMIZED CORE TIP GAP DISTANCE AND RADIUS OF CURVATURE

[75] Inventors: Chiaki Kera, Koide; Toru Tanaka, Koshizi, both of Japan

[73] Assignee: Alps Electric Co., Ltd., Tokyo, Japan

[21] Appl. No.: 442,745

[22] Filed: Nov. 28, 1989

[30] Foreign Application Priority Data

Mar. 17, 1989 [JP] Japan .................. 1-65590

[51] Int. Cl.⁵ ............................ G11B 5/187
[52] U.S. Cl. ........................ 360/122; 360/121
[58] Field of Search ............. 360/121, 125, 119, 122, 360/104

[56] References Cited

FOREIGN PATENT DOCUMENTS 0013313 1/1985 Japan ........................ 360/122
63-239606 10/1988 Japan .

Primary Examiner—Robert S. Tupper
Assistant Examiner—Andrew L. Sniezek
Attorney, Agent, or Firm—Guy W. Shoup; B. Noel Kivlin

[57] ABSTRACT

A magnetic head for a video tape recorder including a mounting base and two transducer elements comprised of a pair of core tips mounted to one end of the mounting base with a small non-transducing gap defined between the core tips. Each of the core tips has a tape sliding surface on which a magnetic tape is slidingly traveled. A radius of curvature R (mm) of the tape sliding surface and a distance W (mm) between the tape sliding surfaces are so set as to satisfy the conditions of $19.5-20W \leq R \leq 21.5-20W$ and $0.15 \leq W \leq 0.45$. Accordingly, a quantity of sinking of the magnetic tape at the gap between both the core tips is limited to thereby reduce a noise in a special reproducing operation such as a reverse video search operation.

1 Claim, 5 Drawing Sheets

MAGNETIC HEAD FOR A VIDEO TAPE RECORDER HAVING OPTIMIZED CORE TIP GAP DISTANCE AND RADIUS OF CURVATURE

BACKGROUND OF THE INVENTION

The present invention relates to a magnetic head for video tape recorders having a pair of core tips, and more particularly to an improvement for limiting a quantity of sinking of a magnetic tape at a gap between both the core tips and reducing a noise in a special reproducing operation.

FIG. 6 is a plan view of a conventional magnetic head for a video tape recorder. The magnetic head includes a substantially square mounting base 1, a pair of projections 1A formed at one end of the mounting base 1, a central slit 2 formed between the projections 1A, and a pair of rectangular core tips 3 fixed at ends of the projections 1A and arranged in a spaced and symmetrical relationship to each other.

Each of the core tips 3 is formed at its end with a tape sliding surface 3A which is configured arcuately as viewed in plan the figure. The tape sliding surface 3A is chamfered at its opposite ends. In the prior art, a radius of curvature of each tape sliding surface 3A and a distance between both the tape sliding surfaces 3A are not precisely controlled. For instance, the radius of curvature is about 7–14 mm and the distance is about 0.05–0.6 mm in the prior art magnetic head for video tape recorders which are commercially available.

The mounting base 1 is formed with a central mounting hole 4 for mounting the magnetic head to a rotating drum of a video tape recorder. A magnetic tape is wound around the rotating drum in operation and is traveled thereby. Thus, the magnetic head operates to scan a recording surface of the magnetic tape during traveling to thereby record and reproduce a signal.

In a general video tape recorder for the people's livelihood, a tension to be applied to the magnetic tape during traveling of the tape in a special reproducing operation such as a video search operation is smaller than that in a normal reproducing operation. In the prior art magnetic head for a video tape recorder, a quantity of sinking of the tape at the gap between the core tips 3 in the special reproducing operation is unstable. Particularly, on the forward side of rotation of the rotating drum where the tension to be applied to the tape is especially small, a contact pressure between the tape and each core tip 3 is insufficient. As a result, there is generated transformation of a reproduced waveform of a single scan at its front end, causing the generation of noise and a reduction in visibility of images.

FIG. 7 shows such a waveform transformation of a reproduced signal as observed by using an oscilloscope. That is, after recording an electrical signal having a fixed amplitude and continuing for 1/60 seconds generated by a signal generator onto a magnetic tape with use of a video tape recorder unit employing the prior art magnetic head, the recorded signal is reproduced in a reverse video search operation with use of the same video tape recorder unit, and a reproduced signal obtained is observed by using the oscilloscope. As apparent from FIG. 7, the waveform transformation is generated at a front end F of the waveform.

SUMMARY OF THE INVENTION

It is an object of the present invention to provide a magnetic head for a video tape recorder which eliminates a waveform transformation or the like in a reproduced signal to prevent the generation of noise in the special reproducing operation such as a reverse video search operation.

The inventors have taken notice of the fact that the waveform transformation in the special reproducing operation is caused by the radius of curvature of each tape sliding surface 3A of the core tips 3 and the distance between both the tape sliding surfaces 3A, and they have tested as will be hereinafter described by variously changing the radius of curvature and the distance to find limited values thereof eliminating the above-mentioned problem.

FIGS. 1 and 2 are plan and elevational views of an essential part of the magnetic head for a video tape recorder according to the present invention. The magnetic head includes two separate transducer elements each comprised of a pair of core tips 10 fixed to one end of a mounting base (not shown) and arranged in a substantially parallel relationship to each other. Each core tip 10 includes a pair of core haves with a transducer gap formed therein. The core tips 10 are mounted on the mounting base adjacent to one another and separated from one another by a non-transducing gap. Each core tip 10 has a tape sliding surface 10A configured arcuately as shown in FIG. 1. The radius of curvature R (mm) of each tape sliding surface 10A and the distance W (mm) between both the tape sliding surfaces 10A (the distance is measured at the center in a direction of thickness of each tape sliding surface (10A) are so set as to satisfy the following conditions.

$$19.5 - 20W \leq R \leq 21.5 - 20W$$

$$0.15 \leq W \leq 0.45$$

A shape and material of the mounting base may be similar to the prior art, and a material of the core tips 10 as well as shapes of the other parts may also be similar to the prior art.

If the value R is less than $19.5-20W$, a contact pressure between the tape and each tape sliding surface 10A is unstable in the special reproducing operation wherein the tension to be applied to the tape during traveling of the tape is small, causing bad tape touch and fluctuation of a waveform level. Further, if the value R is greater than $21.5-20W$, there is generated the waveform transformation at the front end of the waveform of a single scan in the special reproducing operation, resulting in the problem of the prior art magnetic head.

Furthermore, if the value W is less than 0.15 mm, a quantity of sinking of the tape at the gap between both the core tips 10 is too small, while if the value W is greater than 0.45 mm, the quantity of sinking of the tape is too large. In both the cases, the tape touch is rendered bad, resulting in the problem of the prior art magnetic head.

According to the present invention characterized in that the radius of curvature of each tape sliding surface and the distance between both the tape sliding surfaces are set to the above-mentioned values, the quantity of sinking of the tape at the gap between both the core tips 10 is made optimum, and the contact pressure between the tape and each tape sliding surface of the core tips is stabilized. As a result, the waveform level does not fluctuate, and the waveform transformation is not generated in a reproduced signal especially in the special reproducing operation such as a reverse video search operation wherein the tension of the tape during traveling is small.

Other objects and features of the invention will be more fully understood from the following detailed description and appended claims when taken with the accompanying drawings.

DETAILED DESCRIPTION OF THE PREFERRED EMBODIMENT

There will now be described a preferred embodiment demonstrating the effect of the present invention.

A plurality of magnetic heads for video tape recorders having different distances W between the core tips and different radii of curvature R of each tape sliding surface were prepared per lot. The material and the other dimensions of the core tips as well as the other construction inclusive of the mounting base were all common.

Figure 1:
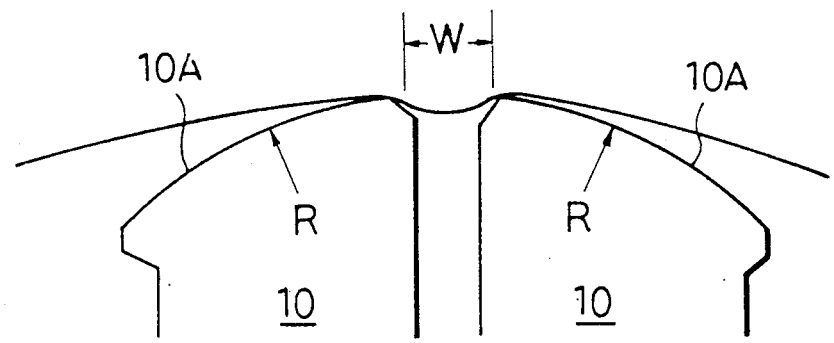
FIGS. 1 and 2 are plan and elevational views of an essential part of the magnetic head for video tape recorders according to the present invention, respectively.
Figure 2:
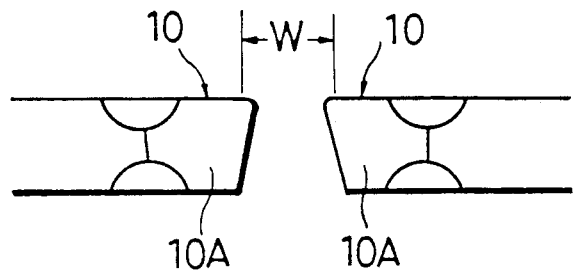
Figure 3:
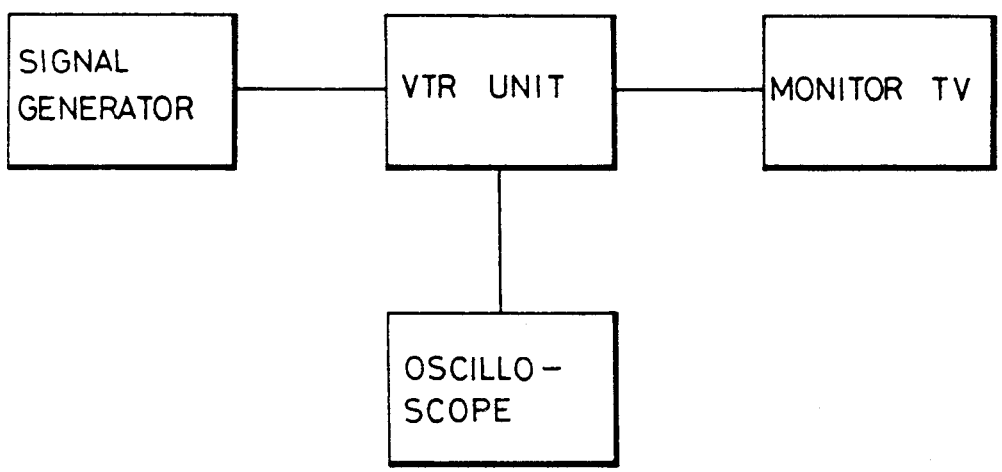
FIG. 3 is a block diagram of a system for demonstrating the effect of the present invention.
Figure 4A:
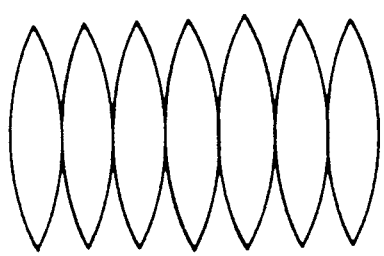
FIGS. 4A and 4B are waveforms of a recorded signal and a reproduced signal, respectively, for evaluation of the test results to be obtained by using the system shown in FIG. 3.

Then, these magnetic heads were mounted to a common video tape recorder unit, and a reproduced signal to be obtained in a special reproducing operation was evaluated for each magnetic head by using a measuring system as shown in FIG. 3. More specifically, a signal having a fixed amplitude and continuing for 1/60 seconds (see FIG. 4A) was generated by a signal generator, and the signal was recorded to a magnetic tape by the video tape recorder unit. Then, the recorded signal was reproduced in a reverse video search operation by the video tape recorder unit to obtain a reproduced signal (see FIG. 4B). A waveform of the reproduced signal was observed by using an oscilloscope, and the presence of noise was monitored by using a monitor TV.

Figure 4B:
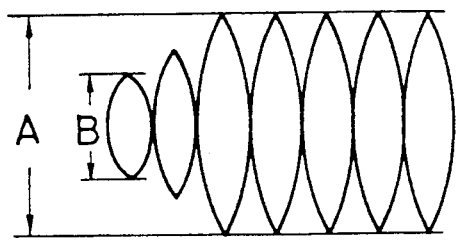

As shown in FIG. 4B, reference character A denotes a reference amplitude of the waveform observed by using the oscilloscope, and reference character B denotes an amplitude of a front end of the waveform. A value of B/A was calculated to evaluate the reproduced signal in accordance with the following criterion.

Good: $0.8 \leq B/A$
Allowable: $0.5 < B/A < 0.8$
Bad: $B/A \leq 0.5$

The result of evaluation is shown in Table 1.

TABLE 1

| Lot No. | Distance (μm) | Radius of Curvature (mm) | Number of Samples | Good | Evaluation Allowable | Bad |
|---|---|---|---|---|---|---|
| 1 | 200 | 12.5–12.9 | 6 | 0 | 3 | 3 |
| 2 | 200 | 13.4–13.7 | 6 | 0 | 0 | 6 |
| 3 | 200 | 14.5–14.9 | 6 | 0 | 6 | 0 |
| 4 | 200 | 15.6–17.3 | 8 | 8 | 0 | 0 |
| 5 | 200 | 16.8–17.7 | 12 | 12 | 0 | 0 |
| 6 | 300 | 12.5–13.1 | 10 | 0 | 8 | 2 |
| 7 | 300 | 13.5–14.1 | 10 | 8 | 2 | 0 |
| 8 | 300 | 14.1–15.2 | 20 | 20 | 0 | 0 |
| 9 | 400 | 11.0–11.2 | 6 | 0 | 0 | 6 |
| 10 | 400 | 11.3–12.0 | 20 | 6 | 10 | 4 |
| 11 | 400 | 11.4–12.6 | 20 | 16 | 4 | 0 |
| 12 | 400 | 12.5–13.4 | 20 | 16 | 4 | 0 |
| 13 | 400 | 13.5–14.5 | 20 | 10 | 9 | 1 |

As apparent from Table 1, the Lot Nos. 4, 5, 8, 11 and 12 belonging to the scope of the present invention exhibit a satisfactory characteristic wherein the waveform transformation at the front end of the reproduced signal is reduced.

Figure 5:
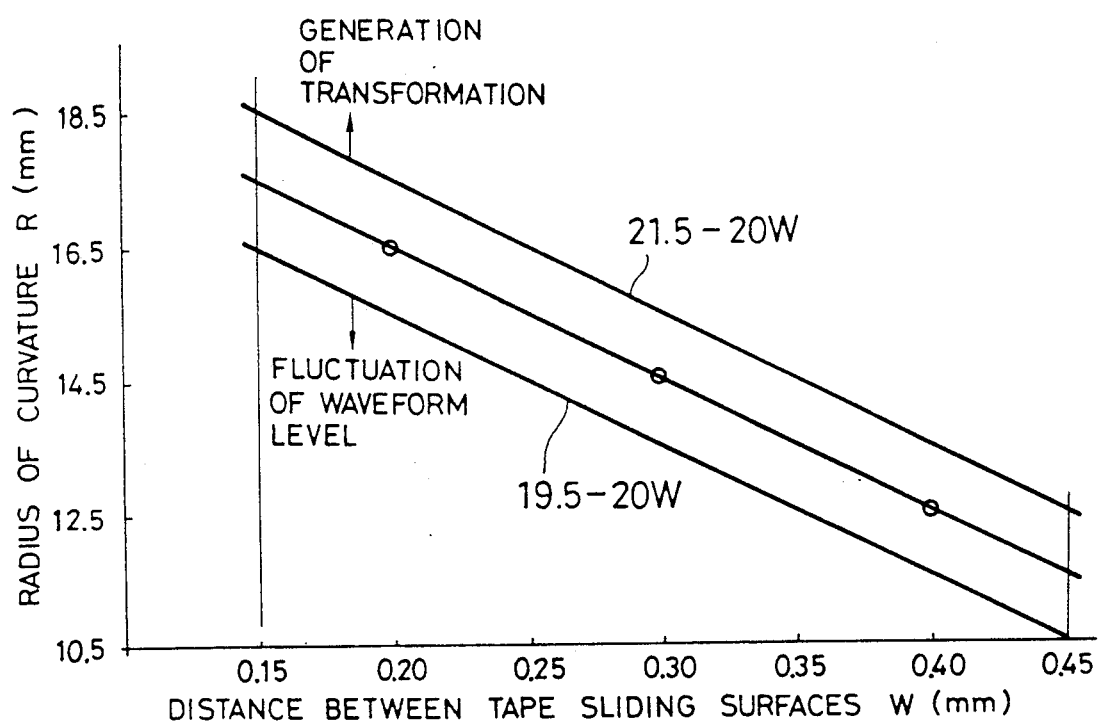
FIG. 5 is a graph showing the effect of the present invention.
Figure 6:
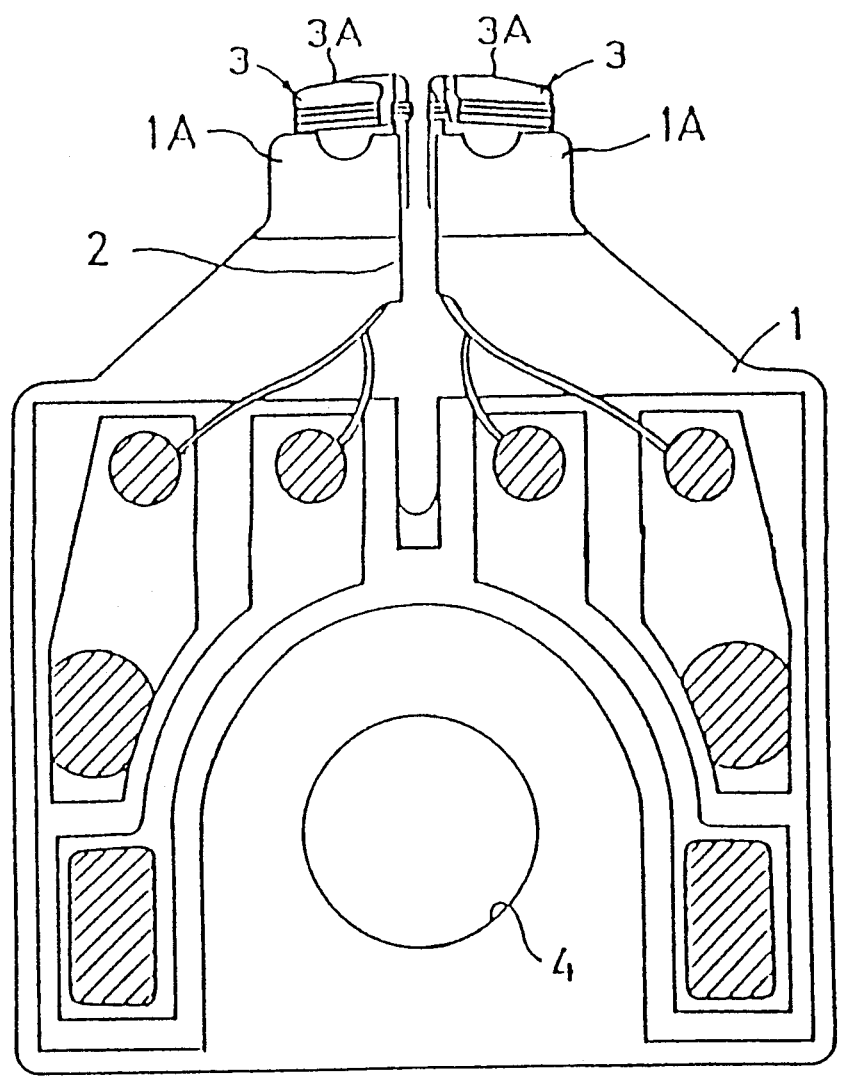
FIG. 6 is a plan view of the magnetic head for a video tape recorder in the prior art.
Figure 7:
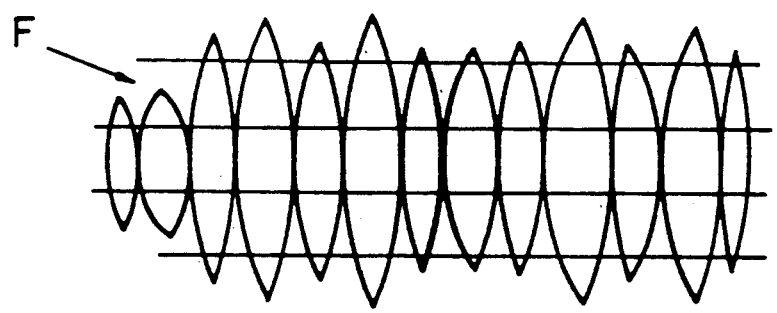
FIG. 7 is a waveform of a reproduced signal as obtained by the prior art magnetic head.

FIG. 5 shows the relationship between the distance W between the tape sliding surfaces and the radius of curvature R of each tape sliding surface according to the present invention, wherein each circle denotes an average of the radii of curvatures in each lot exhibiting the satisfactory characteristic as mentioned above.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A magnetic head arrangement mounted on a rotating drum for a video tape recorder, comprising:

a transducer mounting base provided on said rotating drum;

first and second magnetic transducers each for recording and reproducing information on and from a magnetic tape, said first and second magnetic transducers secured to said mounting base and successively arranged in spaced relation to each other in a direction of rotation of said rotating drum, said first magnetic transducer preceding said second magnetic transducer when said head arrangement is rotated with respect to said magnetic tape; the first transducer including first and second core halves which are coupled to each other to form a magnetic gap, said second magnetic transducer following said first magnetic transducer when rotated with respect to said magnetic tape and including third and fourth core halves which are coupled to each other to form a magnetic gap, said first and third core halves being arranged to face each other across a non--transducing gap between said first and second magnetic transducers, each of said core halves having a surface adjacent said magnetic tape forming a tape sliding surface on which said magnetic tape is slidingly traveled; an improvement wherein a relationship between a radius of curvature R(mm) of said tape sliding surfaces formed by the surfaces of each core halve and a distance W(mm) defining a width of said non-transducing gap along the direction of rotation of said magnetic head arrangement satisfies the following conditions:

$19.5 - 20W \leq R \leq 21.5 - 20W$ $0.15 \leq W \leq 0.45.$

* * * * *